(12) United States Patent
Shang et al.

(10) Patent No.: US 10,855,776 B2
(45) Date of Patent: Dec. 1, 2020

(54) METHOD AND DEVICE FOR MANAGING SESSIONS

(71) Applicant: EMC IP Holding Company LLC, Hopkinton, MA (US)

(72) Inventors: Qiu Shang, Shanghai (CN); Yuan Luo, Shanghai (CN); Mark Yue Qian, Shanghaoi (CN); Colin He Wang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 39 days.

(21) Appl. No.: 15/996,625

(22) Filed: Jun. 4, 2018

(65) Prior Publication Data

US 2018/0352037 A1 Dec. 6, 2018

(30) Foreign Application Priority Data

Jun. 2, 2017 (CN) .......................... 2017 1 0409470

(51) Int. Cl.
*H04L 29/08* (2006.01)
*H04L 29/14* (2006.01)

(52) U.S. Cl.
CPC .......... *H04L 67/146* (2013.01); *H04L 67/145* (2013.01); *H04L 67/148* (2013.01); *H04L 69/40* (2013.01)

(58) Field of Classification Search
None
See application file for complete search history.

(56) References Cited

U.S. PATENT DOCUMENTS

| | | |
|---|---|---|
| 7,254,685 B1 | 8/2007 | Cardente |
| 9,152,578 B1 | 10/2015 | Saad et al. |
| 9,280,555 B1 | 3/2016 | Bono et al. |
| 9,305,009 B1 | 4/2016 | Bono et al. |
| 9,330,155 B1 | 5/2016 | Bono et al. |

(Continued)

OTHER PUBLICATIONS

Bono, Jean-Pierre, et al.; "Preserving Quality of Service When Replicating Data Objects," U.S. Appl. No. 14/576,939, filed Dec. 19, 2014.

(Continued)

*Primary Examiner* — Cai Y Chen
(74) *Attorney, Agent, or Firm* — BainwoodHuang

(57) ABSTRACT

A method and device for managing sessions comprises obtaining first identification information of a first session of a plurality of sessions and group operation identification information of a group operation to be performed for the plurality of sessions, each of the plurality of sessions replicating, from a source of the session to a destination of the session, a file system or a management system that manages the file system; determining whether the first session meets a condition that a session is suitable to be selected as a managing session, the managing session managing the plurality of sessions to perform the group operation on the plurality of sessions; in response to the first session failing to meet the condition, obtaining second identification information of a second session of the plurality of sessions, the second identification information being different from the first identification information; and selecting the managing session based on the second identification information.

16 Claims, 8 Drawing Sheets

(56) References Cited

U.S. PATENT DOCUMENTS

| | | | |
|---|---|---|---|
| 9,378,219 B1 | 6/2016 | Bono et al. | |
| 9,378,261 B1 | 6/2016 | Bono et al. | |
| 9,880,777 B1 | 1/2018 | Bono et al. | |
| 9,881,014 B1 | 1/2018 | Bono et al. | |
| 9,916,202 B1 | 3/2018 | Seela et al. | |
| 9,983,942 B1 | 5/2018 | Seela et al. | |
| 10,037,251 B1 | 7/2018 | Bono et al. | |
| 10,037,369 B1 | 7/2018 | Bono et al. | |
| 10,089,202 B1 | 10/2018 | Gaurav et al. | |
| 10,114,582 B1 | 10/2018 | Rao et al. | |
| 10,261,708 B1 | 4/2019 | Ippatapu et al. | |
| 10,289,690 B1 | 5/2019 | Bono et al. | |
| 10,318,207 B1 | 6/2019 | Subramanian et al. | |
| 10,437,509 B1 | 10/2019 | Alexeev et al. | |
| 10,459,642 B2 | 10/2019 | Wang et al. | |
| 2014/0282777 A1* | 9/2014 | Gonder | H04L 65/605 725/109 |
| 2015/0280959 A1* | 10/2015 | Vincent | H04L 67/1097 709/203 |
| 2016/0196322 A1 | 7/2016 | Xu et al. | |
| 2017/0070919 A1* | 3/2017 | Verger | H04W 76/23 |

OTHER PUBLICATIONS

Tummala, Himabindu, et al.; "Managing Snaps at a Destination Based on Policies Specified at a Source," U.S. Appl. No. 14/674,358, filed Mar. 31, 2015.

Liao, Zexian, et al.; "Data Storage System With Transparent Presentation of File Attributes During File System Migration," U.S. Appl. No. 15/582,712, filed Apr. 30, 2017.

Zhang, Tianming, et al.: "Providing Data Protection to Destination Storage Objects on Remote Arrays in Response to Assignment of Data Protection to Corresponding Source Storage Objects on Local Arrays," U.S. Appl. No. 16/048,486, filed Jul. 30, 2018.

Haravu, Nagasimha, et al.; "A Unified Approach to Import, Replication, and Migration of a Storage Volume," U.S. Appl. No. 16/049,148, filed Jul. 30, 2018.

Zhang, Tianming, et al.: "Utilizing Groups of Data Protection Policies That Are Assignable to Storage Objects," U.S. Appl. No. 16/048,489, filed Jul. 30, 2018.

* cited by examiner

METHOD AND DEVICE FOR MANAGING SESSIONS

RELATED APPLICATIONS

This application claim priority from Chinese Patent Application Number CN201710409470.7, filed on Jun. 2, 2017 at the State Intellectual Property Office, China, titled "METHOD AND APPARATUS FOR MANAGING SESSIONS" the contents of which is herein incorporated by reference in its entirety.

FIELD

Embodiments of the present disclosure generally relate to the field of session management, and more specifically, to a method and device for selecting a managing session from a plurality of sessions.

BACKGROUND

Asynchronous and/or synchronous replication is a common storage technology for long-distance metro level data protection. Asynchronous and/or synchronous replication is well supported at a Network Attached Storage (NAS) server and file system level, such that the NAS server and the file system can be mirrored at different sites. In a system supporting asynchronous and/or synchronous replication, group operations are introduced to improve user experience, enhance performance and reduce data unavailability in disaster recovery operations. When the group operations are performed, it is a challenge to improve performance and robustness of the system supporting asynchronous and/or synchronous replication, as well as reduce errors of the system.

SUMMARY

Embodiments of the present disclosure provide method and device for managing sessions.

In a first aspect of the present disclosure, there is provided a method for managing sessions. The method comprises: obtaining first identification information of a first session of a plurality of sessions and group operation identification information of a group operation to be performed for the plurality of sessions, each of the plurality of sessions replicating, from a source of the session to a destination of the session, a file system or a management system that manages the file system; determining whether the first session meets a condition that a session is suitable to be selected as a managing session, the managing session managing the plurality of sessions to perform the group operation on the plurality of sessions; in response to the first session failing to meet the condition, obtaining second identification information of a second session of the plurality of sessions, the second identification information being different from the first identification information; and selecting the managing session based on the second identification information.

In a second aspect of the present disclosure, there is provided a device for managing sessions. The device comprises at least one processing unit and at least one memory coupled to the at least one processing unit and having stored thereon instructions executed by the at least one processing unit. The instructions, when executed by the at least one processing unit, cause the device to perform actions comprising: obtaining first identification information of a first session of a plurality of sessions and group operation identification information of a group operation to be performed for the plurality of sessions, each of the plurality of sessions replicating, from a source of the session to a destination of the session, a file system or a management system that manages the file system; determining whether the first session meets a condition that a session is suitable to be selected as a managing session, the managing session managing the plurality of sessions to perform the group operation on the plurality of sessions; in response to the first session failing to meet the condition, obtaining second identification information of a second session of the plurality of sessions; and selecting the managing session based on the second identification information.

In a third aspect of the present disclosure, there is provided a computer program product being tangibly stored on a non-transient computer readable medium and comprising machine executable instructions, the machine executable instructions, when executed, cause the machine to perform any steps of the method according to the first aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following more detailed description of the example embodiments of the present disclosure with reference to the accompanying drawings, the above and other objectives, features, and advantages of the present disclosure will become more apparent. In example embodiments of the present disclosure, the same reference signs usually represent the same components.

Throughout the drawings, the same or corresponding reference signs refer to the same or corresponding parts.

DETAILED DESCRIPTION OF EMBODIMENTS

Figure 1:
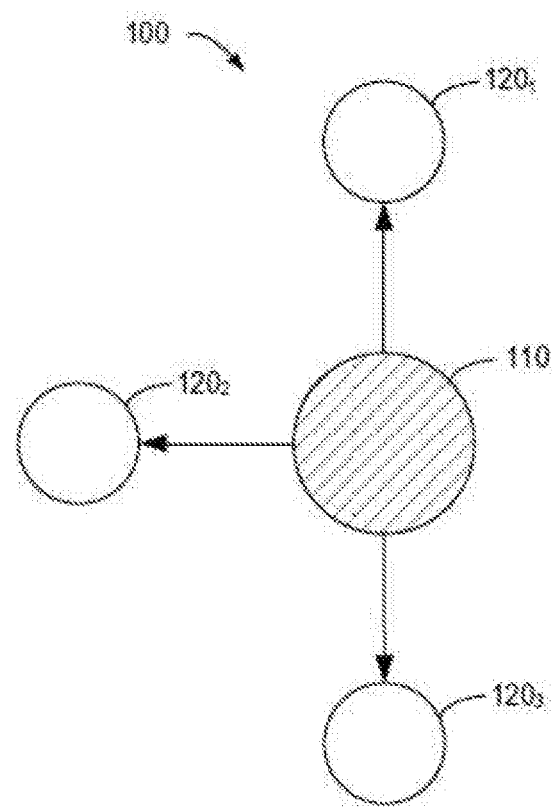
FIG. 1 illustrates a schematic diagram of an example of a centralized managing session structure.

Preferred embodiments of the present disclosure will be described in the following in greater detail with reference to the drawings. Although the preferred embodiments of the present disclosure are displayed in the drawings, it is to be understood that the present disclosure may be implemented in various manners, and should not be limited to the embodiments illustrated herein. On the contrary, these embodiments are provided to make the present disclosure more thorough and complete and fully convey the scope of the present disclosure to those skilled in the art.

As used herein, the term "include" and its variants are to be read as open-ended terms that mean "include, but is not limited to." The term "or" is to be read as "and/or" unless the context clearly indicates otherwise. The term "based on" is to be read as "based at least in part on." The terms "an example embodiment" and "an embodiment" are to be read as "at least one example embodiment." The term "another embodiment" is to be read as "at least one further embodiment." The terms "first" and "second" can represent different or same objects. The following text may also include other explicit and implicit definitions.

In a system supporting asynchronous and/or synchronous replication, it is required to select one managing session from a management system session, for example, an NAS server session, and its associated file system sessions when performing a group operation. The managing session is responsible for determining which file system sessions are associated with the management system session, assigning the group operation to the file system sessions, coordinating the file system sessions, and collecting results from the file system sessions. Traditionally, a centralized managing session structure is adopted for selecting the managing session. FIG. 1 illustrates a schematic diagram of an example of the centralized managing session structure 100. As shown in FIG. 1, the centralized managing session structure 100 includes a management system session 110 and file system sessions $120_1$, $120_2$ and $120_3$ (hereinafter, collectively referred to as file system session 120).

The management system session 110 is a session for implementing replication of the management system. In some embodiments, the management system can be replicated from a source of the management system session 110 to its destination. Similarly, the file system session 120 is a session for implementing replication of the file system. In some embodiments, the file system can be replicated from a source of the file system session 120 to its destination.

The management system can manage the file systems to perform data migration tasks between the file systems. Specifically, the management system is a container that includes at least one file system and the file system can be mounted/created in the management system. The file system can utilize various services provided by the management system, such as DNS (Domain Name System) service and the like. The file system can be, but not limited to, Linux file systems such as ext2, ext3 and the like.

There may be a plurality of management systems in the system supporting asynchronous and/or synchronous replication. One management system can separately manage the file systems with other management systems. Therefore, the file systems can be grouped according to the management system. In some embodiments, the management system and one or more file systems managed by the management system are grouped together. Accordingly, the management system session 110 and the file system session 120 can be grouped to perform the group operation for the sessions. In some embodiments, the management system session 110 for the management system and the one or more file system sessions 120 for the one or more file systems managed by the management system are grouped together.

As stated above, the group operation is introduced to improve user experience, enhance performance and reduce data unavailability in disaster recovery operations. The group operation can control the management system, one or more file systems managed by the management system, the management system session 110 for the management system and the file system session 120 for the one or more file systems.

In some embodiments, the group operation can control whether the management system and the file system provide services to external devices, such as controlling the management system/file system to act as an active management system/file system or a standby management system/file system. Besides, the group operation can control states and directions of the management system session 110 and the file system session 120. In some embodiments, the group operation can be, but not limited to, for example, group failover, group failover with synchronization and group failback.

As stated above, one managing session is required for performing the group operation. The managing session is responsible for determining sessions associated with it, assigning the group operation to the associated sessions, coordinating the associated sessions and collecting results from the associated sessions. Hereinafter, one session being associated with a further session means that the session and the further session are grouped together.

Because the management system manages the file systems, traditionally, the management system 110 is always selected as the managing session, resulting in a centralized managing session structure 100 shown in FIG. 1.

Disadvantages of this solution lie in that the group operation has a close dependency on the management system session 110. Once the management system session 110 is in a state or direction which is not allowed for the group operation, the group operation related to the file system session 120 associated with the management system session 110 will be prevented.

Figure 2A:
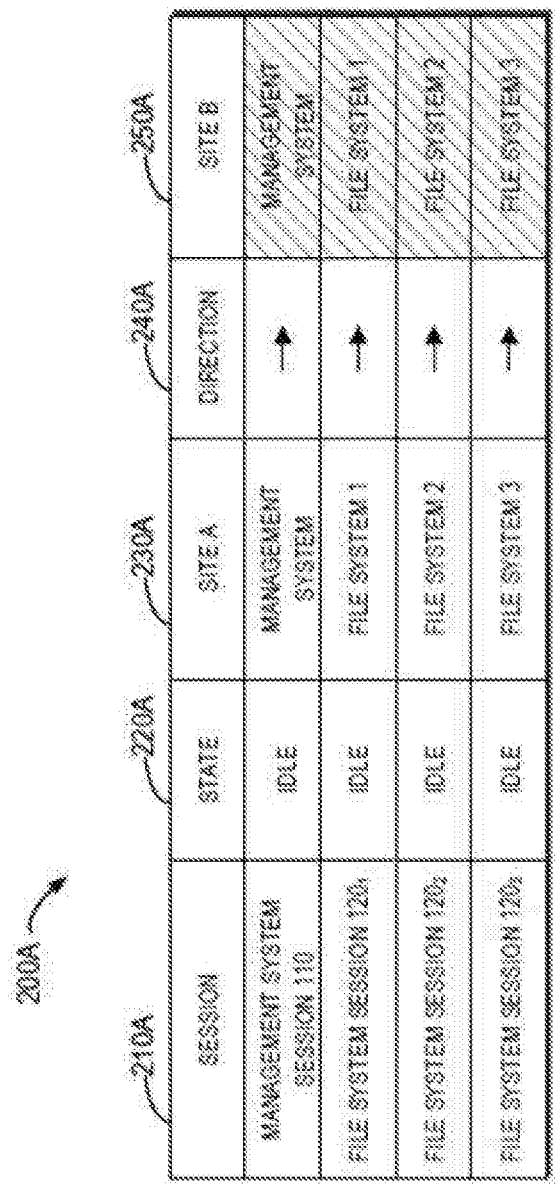
FIG. 2A illustrates a schematic diagram of an example of information about a management system, file systems and their associated sessions before performing a group operation in the centralized managing session structure.

FIG. 2A illustrates a schematic diagram of an example of information 200A about a management system, file systems and their associated sessions before performing a group operation in the centralized managing session structure 100. In FIG. 2A, session 210A indicates a management system session 110 and file system sessions $120_1$-$120_3$ associated with the management system session 110. The management system session 110 is associated with the management system in FIG. 2A, and the file system sessions $120_1$-$120_3$ are associated with the file systems 1-3 in FIG. 2A, respectively. The management system manages the file systems 1-3. In other words, the management system and the file systems 1-3 are in the same group. In this case, the management system session 110 for the management system and the file system sessions $120_1$-$120_3$ for the file systems 1-3 are also in the same group. Therefore, the group operation can be performed for the management system session 110 and the file system sessions $120_1$-$120_3$.

State 220A indicates states of the management system session 110/the file system session 120. For example, the state 220A can include, but not limited to, one of the following states: idle, failover, automatic synchronization, lost communication and unrecoverable and the like. As shown in FIG. 2A, the management system session 110 and the file system sessions $120_1$-$120_3$ are in the idle state before performing the group operation. In the idle state, the management system session 110/the file system session 120 can transmit data for implementing replication of the management system/file system.

Site A 230A and site B 250A indicate sites in which the management system and the file systems locate. The management system and the file systems can be mirrored at different sites (for example, the site A 230A and the site B 250A). The management system/the file system at different sites can serve as an active management system/active file system or a standby management system/standby file system.

In FIG. 2A, the standby management system/file system is shown in shadow. As shown in FIG. 2A, before performing the group operation, the management system/file system at the site A230A is an active management system/active file system, and the management system/file system at the site B 250A is a standby management system/file system.

The active management system/file system can provide services to the external devices. For example, the active management system/file system can receive from a user a user request for operating the active management system/file system. The user request can be, for example, reading/writing/deleting/updating data in the active management system/file system.

The standby management system/file system usually does not provide services for the external devices. Instead, it serves as a copy of the active management system/file system. The active management system/file system at one site (for example, site A) can be replicated via the management system session 110/the file system session 120 to a further site (for example, site B) for mirroring.

Direction 240 indicates directions of replication performed by the management system session 110/the file system session 120. The direction 240 can indicate sources and destinations of the management system session 110/the file system session 120. For the sake of convenience, the side of the active management system/file system is referred to as the source of the management system session 110/the file system session 120, while the side of the standby management system/file system is referred to as the destination of the management system session 110/the file system session 120. The active management system/file system is replicated to the destination of the management system session 110/the file system session 120 from the source of the management system session 110/the file system session 120.

As shown in FIG. 2A, the site A is the source of the management system session 110/the file system session 120, and site B is the destination of the management system session 110/the file system session 120. Accordingly, the direction of the management system session 110/the file system session 120 is from the site A to the site B.

In an example, the active management system/file system at the source of the management system session 110/the file system session 120 is replicated via the management system session 110/the file system session 120 to the destination of the management system session 110/the file system session 120 at a predetermined time interval (such as one minute, one hour, one day etc.) in the system supporting asynchronous replication. In some embodiments, only the part of the active management system/file system being changed is replicated to the destination via the management system session 110/the file system session 120.

In another example, in the system supporting synchronous replication, in response to performing operations on the active management system/file system, such as writing data into the active management system/file system, the active management system/file system at the source of the management system session 110/the file system session 120 is replicated via the management system session 110/the file system session 120 to the destination of the management system session 110/the file system session 120. Similar to the system supporting asynchronous replication, in some embodiments, only the part of the active management system/file system being changed is replicated to the destination via the management system session 110/the file system session 120.

In some cases, the users may expect to switch the active management system/file system and the standby management system/file system, and change the direction of the management system session 110/file system session 120 accordingly. In other words, the source and the destination of the management system session 110/file system session 120 are switched. For example, in the case that a disaster occurs at the site A, the users may expect to switch the active management system/file system at the site A to the standby management system/file system, change the standby management system/file system at site B to the active management system/file system, and thus changing the direction of the management system session 110/file system session 120 to be the direction from the site B to the site A.

Such switch can be implemented by performing the group operation. As described above, the group operation can be the group failover, the group failover with synchronization and the group failback. One managing session is required for performing the group operation. In the centralized managing session structure 100, the management system session 110 is always selected as the managing session. Therefore, the management system session 110 is responsible for determining the file system sessions $120_1$-$120_3$, assigning the group operation to the file system sessions $120_1$-$120_3$, coordinating the file system sessions $120_1$-$120_3$ and collecting results from the file system sessions $120_1$-$120_3$.

Figure 2B:
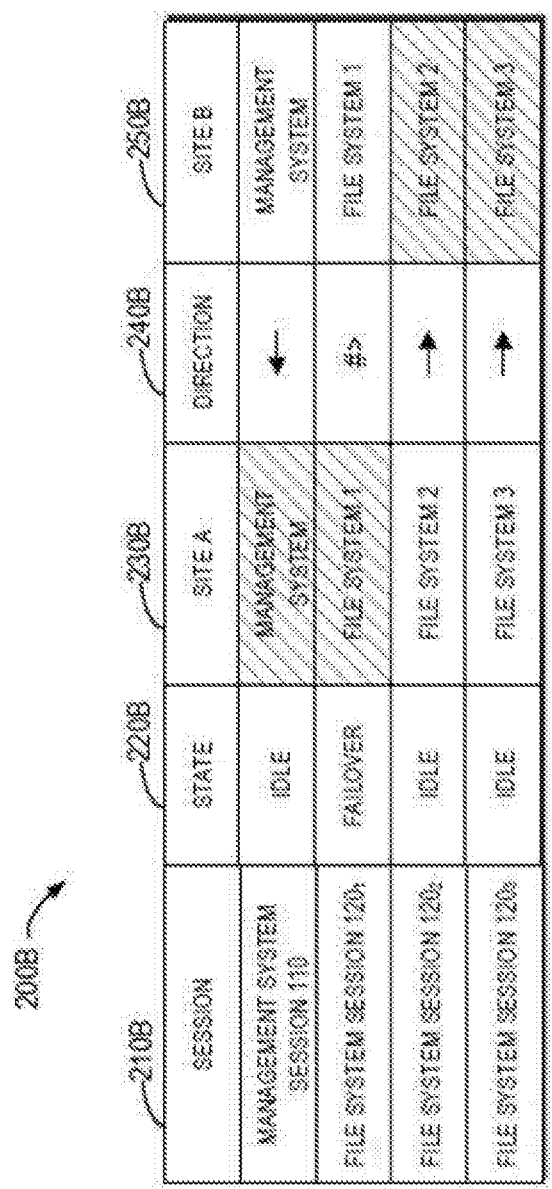
FIG. 2B illustrates a schematic diagram of an example of information about a management system, file systems and their associated sessions after performing a group operation in the centralized managing session structure.

In an example of the group failover operation, users at the destination (the site B in this example) of the managing session (the management system session 110 in this example) can request the system that supports the asynchronous and/or synchronous replication for performing the group failover operation. FIG. 2B illustrates a schematic diagram of an example of information 200B about management system, file systems and their associated sessions after performing a group failover operation in a system that supports asynchronous and/or synchronous replication.

As shown in FIG. 2B, after performing the group failover operation, the management system and the file system 1 at the site A are switched to the standby management system and the standby file system 1, and the management system and the file system 1 at the site B are switched to the active management system and the active file system 1. Meanwhile, the directions of the management system session 110 and the file system session $120_1$ are switched to be the directions from the site B to the site A.

Moreover, in the example of FIG. 2B, because the recovery operation is performed after performing the group failover operation, the state of the management system session 110 is an idle state. As described above, the management system session 110, in the idle state, can transmit data for performing replication of the management system. For comparison, because the recovery operation is not performed after performing the group failover operation, the state of the file system session $120_1$ is a failover state. The file system session $120_1$, in the failover state, can suspend data transmission, such that the replication of the file system cannot be realized.

In some cases, the group operation may fail due to system failure for example. At this time, because the group operation has already been performed on the management system session 110, the management system session 110 no longer satisfies the condition of acting as the managing session, such that the group operation for the file system session $120_2$ and the file system session $120_3$ associated with the management system session 110 will be blocked.

For example, in the case of performing the group failover operation, the group failover operation must be initiated at the destination of the managing session. As shown in FIG. 2B, because the site B has been switched to the source of the management system session 110, the management system session 110 cannot act as the managing session when the group operation fails. In this case, the group failover operation cannot be performed on the file system session $120_2$ and the file system session $120_3$ on which the group failover operation is not performed, due to the absence of the managing session.

As shown in FIG. 2B, because the group failover operation cannot be performed on the file system session $120_2$ and the file system session $120_3$, the file system 2 and the file system 3 at the site A are kept as the active file system 2 and the active file system 3, and the file system 2 and the file system 3 at the site B are kept as the standby file system 2 and the standby file system 3, similar to FIG. 2A. Meanwhile, the directions of file system session $120_2$ and file system session $120_3$ are kept to be the directions from the site A to the site B, and the states of the file system session $120_2$ and file system session $120_3$ are kept as idle.

Traditionally, there are two solutions to the problem. One solution is to perform, one by one, operations on the file system and its associated file system sessions on which the group failover operation is not performed. For example, failover operations are performed separately on the file system 2 and the file system 3, and their associated file system session $120_2$ and file system session $120_3$. However, when a group consists of a large number of file systems, such solution is extremely time-consuming and unpractical. The other solution is to make substantial changes to the system supporting asynchronous and/or synchronous replication from control plane to data plane, which will make system maintenance difficult.

To at least partially solve the above problem and one or more of other potential problems, example embodiments of the present disclosure provide a scheme for managing sessions. The scheme employs a decentralized managing session structure to avoid the group operation to have a close dependency on a specific session, for example, the management system session 110, so as to improve performance and robustness of the system supporting asynchronous and/or synchronous replication and reduce errors of the system in a concise and effective way.

Figure 3:
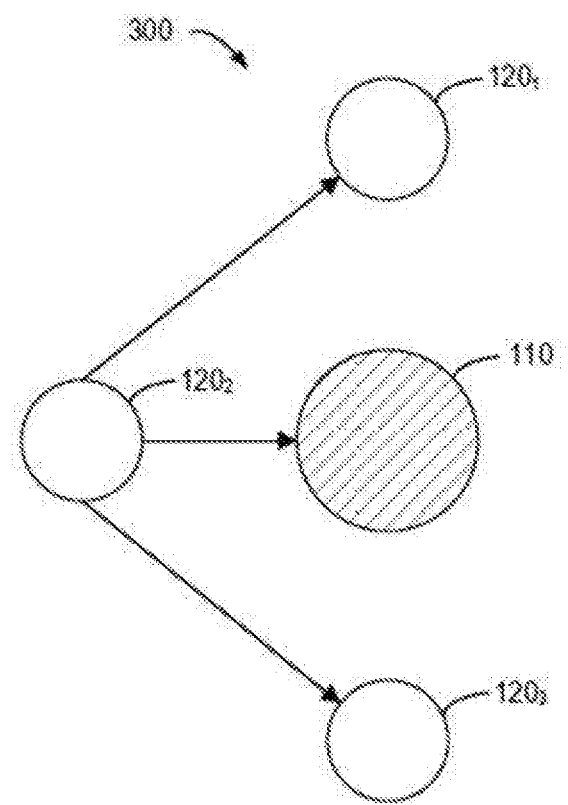
FIG. 3 illustrates a schematic diagram of an example of a decentralized managing session structure according to embodiments of the present disclosure.

FIG. 3 illustrates a schematic diagram of an example of a decentralized managing session structure 300 according to embodiments of the present disclosure. It should be appreciated that the decentralized managing session structure 300 shown in FIG. 3 is only for the purpose of examples without suggesting any limitation to the scope of the present disclosure. Embodiments of the present disclosure can be embodied in different structures.

As shown in FIG. 3, the decentralized managing session structure 300 includes a management system session 110 and file system sessions $120_1$, $120_2$ and $120_3$. Because the management system session 110 and the file system session 120 in FIG. 3 are the same as those of FIG. 1, their description will be omitted here.

FIG. 3 differs from FIG. 1 in that, the management system session 110 is always selected as the managing session of the group operation in the centralized managing session structure 100 shown in FIG. 1, while the management system session 110 and the file system session 120, when satisfying a condition that a session is suitable to be selected as a managing session, can both be selected as the managing session of the group operation in the decentralized managing session structure 300 shown in FIG. 3.

As shown in FIG. 3, the file system session $120_2$ is selected as the managing session. Therefore, the file system session $120_2$ is responsible for determining its associated management system session 110 and file system sessions $120_1$ and $120_3$, assigning group operation to the management system 110 and the file system sessions $120_1$ and $120_3$, coordinating the management system 110 and the file system sessions $120_1$ and $120_3$, and collecting results from the management system 110 and the file system sessions $120_1$ and $120_3$.

It can be seen from the above description that embodiments of the present disclosure not only can select the management system session 110 as the managing session of the group operation, but also can select the file system session 120 as the managing session by employing the decentralized managing session structure 300, so as to avoid the group operation to have a close dependency on a specific session, for example, the management system session 110.

Figure 4:
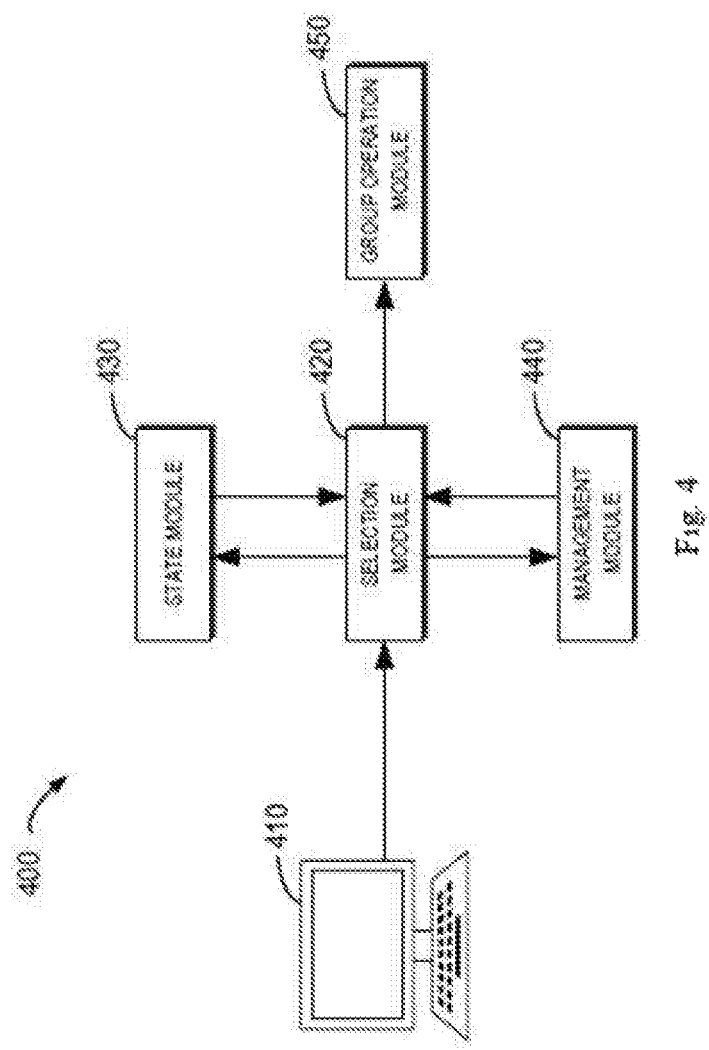
FIG. 4 illustrates a schematic diagram of an example of a session management system according to embodiments of the present disclosure.

FIG. 4 illustrates a schematic diagram of an example of a session management system 400 according to embodiments of the present disclosure. The session management system 400 may implement the decentralized managing session structure of FIG. 3. As shown in FIG. 4, the session management system 400 can include a client 410, a selection module 420, a state module 430, a management module 440 and a group operation module 450.

The client 410 can specify a session (referred to as "first session") and a group operation to the selection module 420. The group operation is to be performed on the first session and one or more other sessions in a group to which the first session belongs. In some embodiments, the client 410 can provide, to the selection module 420, session identification information (referred to as "first identification information") of the first session and group operation identification information of the group operation. The session identification information can be, for example, session name information, session identity information and the like. Similarly, the group operation identification information can be, for example, group operation name information, group operation identity information.

The first session can be the management system session 110 or the file system session 120 associated with the management system session 110. As described above, the file system session 120 being associated with the management system session 110 means that the file system for the file system session 120 is managed by the management system for the management system session 110. In other words, the management system session 110 and the file system session 120 are grouped together.

Additionally, as described above, the group operation can control whether the management system and the file system provide services to the external devices, and can control states and directions of the management system session 110 and the file system session 120. The group operation can be, for example, group failover, group failover with synchronization and group failback.

The client 410 can be a desktop computer, a laptop computer, a tablet computer, a smart phone, a personal digital assistant, and the like. The type of the client 410 does not constitute restrictions to embodiments of the present disclosure.

The selection module 420 can select a managing session of the group operation. In response to receiving the first session identification information and the group operation identification information from the client 410, the selection module 420 determines whether the first session specified by the client 410 satisfies the condition that a session is suitable to be selected as a managing session. As stated above, the managing session can manage its associated management system session 110 and/or file system session 120, i.e., managing the management system session 110 and/or the file system session 120 in the same group, to perform the group operation on these sessions. In some embodiments, the managing session can be responsible for determining which management system session 110 and/or file system session 120 are associated therewith, assigning group operation to the associated sessions, coordinating the associated sessions and collecting results from the associated sessions.

The selection module 420 can determine, based on the group operation specified by the client 410, the condition that should be met by a session to be selected as the managing session in the group operation. In some embodiments, the selection module 420 can determine the condition based on the group operation identification information. For example, in the example of the group failover operation, the session that can be selected as the managing session is required to satisfy the following conditions: the state of the session is idle, automatic synchronization, lost communication and unrecoverable, and the direction of the session is that a side initiating the group operation is the destination of the session.

In some embodiments, the selection module 420 can obtain, based on the first session identification information, the state of the first session from the state module 430 having stored thereon the state of the management system session 110 and the file system session 120, and compare whether the state of the first session matches the condition that should be satisfied by a session to be selected as the managing session in the group operation. When the selection module 420 determines that the first session satisfies the condition, it can select the first session as the managing session.

Otherwise, the selection module 420 will obtain the session identification information (referred to as "second identification information") of the session (referred to as "second session") associated with the first session. As described above, the first session being associated with the second session means that the first session and the second session are in the same group. In some embodiments, the selection module can request, based on the first session identification information, the management module 440 that manages the sessions for the second session in the same group.

The selection module 420 can determine whether the second session meets the condition that should be satisfied by a session to be selected as the managing session in the group operation. When the selection module 420 determines that the second session satisfies the condition, it can select the second session as the managing session. Otherwise, the selection module 420 will continue to determine whether the remaining sessions in the same group as the first session meet the condition that should be satisfied by a session to be selected as the managing session in the group operation, until the selection module 420 selects the managing session or determines that none of the sessions in the group satisfies the condition.

When the selection module 420 has determined the managing session, it can provide the managing session to the group operation module 450. In some embodiments, the selection module 420 can provide, to the group operation module 450, the session identification information of the session being selected as the managing session.

In response to receiving the managing session, the group operation module 450 performs the group operation on the managing session and other sessions in the same group as the managing session. In some embodiments, the managing session can trigger the performance of the group operation on the other sessions in the same group as the managing session, and receive results of the performance of the group operation from the other sessions. For example, the result can indicate whether the group operation on the session is successful.

In some embodiments, the group operation may have already been performed on some sessions in the group. For example, the group operation may have already been performed on the management system session 110 and the file system session $120_1$ as shown in FIG. 2B. In this case, the managing session will not trigger the performance of the group operation on the sessions on which the group operation has already been performed. For example, when the file system session $120_2$ is selected as the managing session, the file system session $120_2$ only triggers the performance of the group operation on the file system session $120_3$, without triggering the performance of group operation on the management system session 110 and the file system session $120_1$.

It can be seen from the above description that embodiments of the present disclosure avoid the group operation from having a close dependency on a specific session, for example, the management system session 110. In this case, the group operation on the file system session 120 can still be performed when the management system session 110 is in a state or direction prohibiting the group operation, thereby improving performance and robustness of the system supporting asynchronous and/or synchronous replication and reducing errors.

Figure 5:
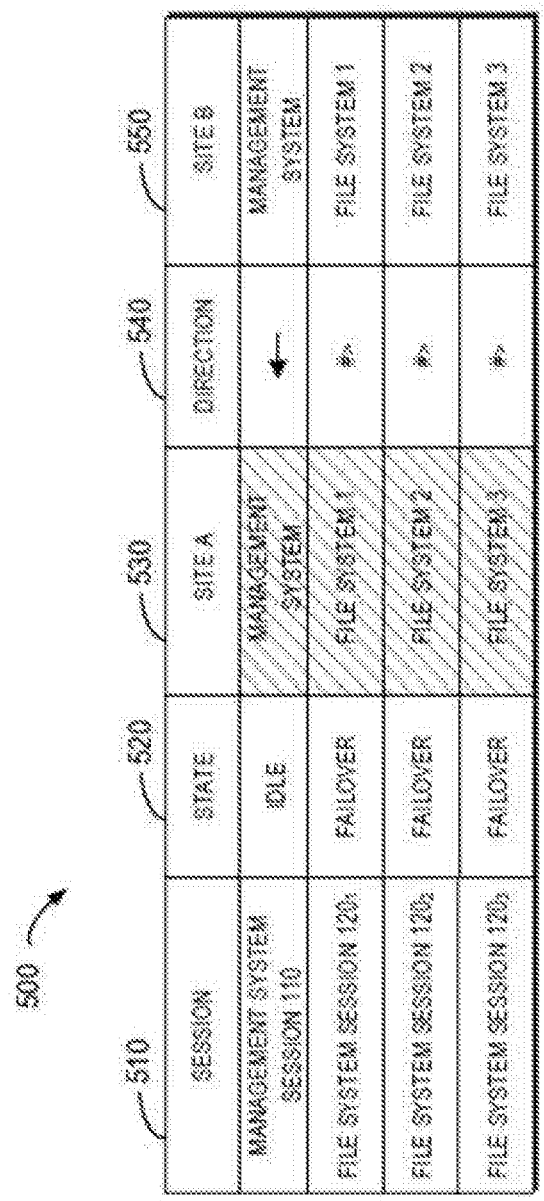
FIG. 5 illustrates a schematic diagram of an example of information about a management system, file systems and their associated sessions after performing a group operation in the decentralized managing session structure according to embodiments of the present disclosure.

FIG. 5 illustrates a schematic diagram of an example of information 500 about management system, file systems and their associated sessions after performing group operation in the decentralized managing session structure 300 according to embodiments of the present disclosure. In the example shown in FIG. 2B, in the centralized managing session structure 100, the group operation performed on the file system session $120_2$ and the file system session $120_3$ fails, due to the system failure, for example. However, in the decentralized managing session structure 500, the file system session $120_2$ can still be selected as the managing session in the case of group operation failure. Accordingly, apart from the management system session 110 and the file system session $120_1$, the file system session $120_2$ and the file system session $120_3$ also successfully perform the group operation, as shown in FIG. 5.

Figure 6:
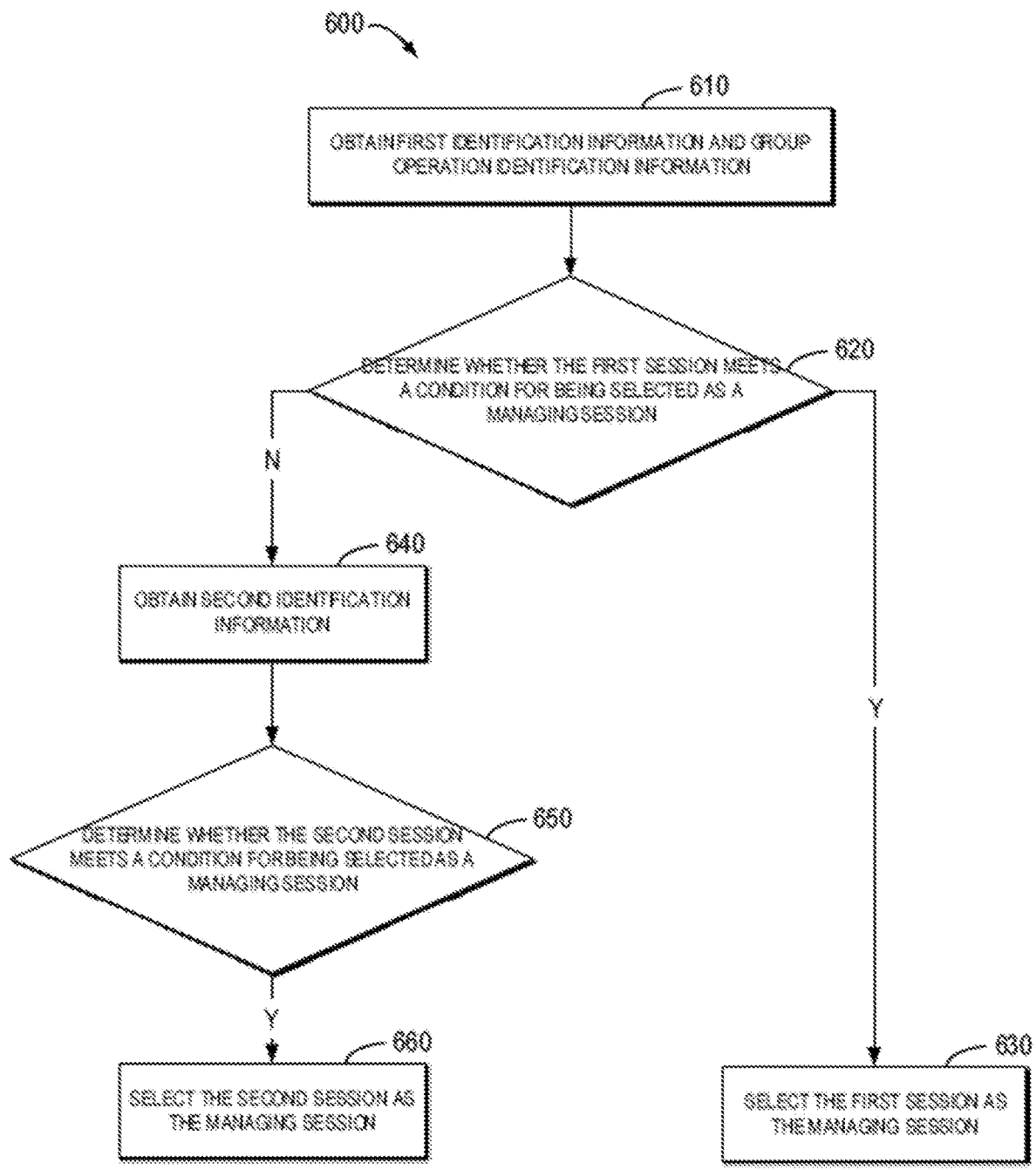
FIG. 6 illustrates a flowchart of a method for selecting a managing session according to embodiments of the present disclosure.

FIG. 6 illustrates a flowchart of a method 600 for selecting a managing session according to embodiments of the present disclosure. For example, the method 600 can be performed by the selection module 420 shown in FIG. 4. It should be understood that the method 600 can also contain additional steps not shown and/or omit the shown steps, and the scope of the present disclosure is not restricted in this regard.

At 610, the selection module 420 obtains from the client 410 first identification information of the first session and group operation identification information of the group operation. The group operation is performed on the first session and one or more other sessions in the group to which the first session belongs. At 620, the selection module 420 determines whether the first session satisfies the condition that a session is suitable to be selected as a managing session. In some embodiments, the selection module 420 can determine the condition based on the group operation identification information. In some embodiments, the selection module 420 can obtain, based on the first session identification information, the state of the first session from the state module 430, and compare to determine whether the state of the first session matches the condition.

If the first session satisfies the condition that a session is suitable to be selected as a managing session, the selection module selects the first session as the managing session at 630. Otherwise, the selection module 420 obtains the second identification information of the second session associated with the first session at 640. As described above, the first session being associated with the second session means that the first session and the second session are in the same group. In some embodiments, the selection module 420 can request, based on the first session identification information, the management module 440 for the second identification information of the second session in the same group. At 650, the selection module 420 determines whether the second session meets the condition that should be satisfied by a session to be selected as the managing session in the group operation. In some embodiments, similar to the first session, the selection module 420 can obtain, based on the second session identification information, the state of the second session from the state module 430, and compare to determine whether the state of the second session matches the condition. When the selection module 420 determines that the second session meets the condition, the selection module 420 selects the second session as the managing session at 660.

It can be seen from the above description that embodiments of the present disclosure can select a managing session from the management system session and the file system session by means of the decentralized managing session structure 300, which avoids the group operation having a close dependency on a specific session, for example, the management system session 110.

Figure 7:
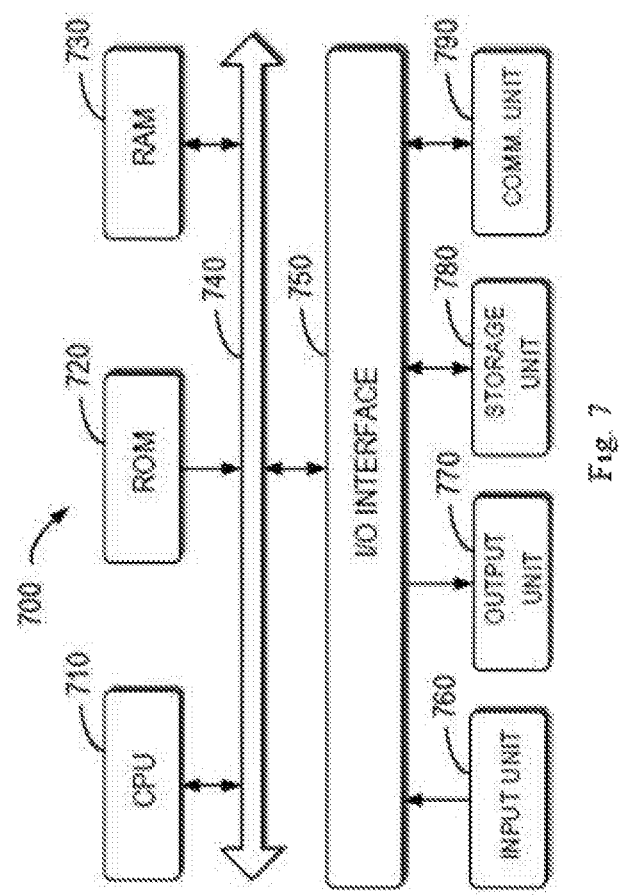
FIG. 7 illustrates a schematic diagram of an example device for implementing embodiments of the present disclosure.

FIG. 7 illustrates a schematic diagram of an example device 700 for implementing embodiments of the present disclosure. For example, the session management system shown in FIG. 4 can be implemented by the device 700. As shown, the device 700 includes a central process unit (CPU) 710, which can perform various suitable actions and processing based on the computer program instructions stored in the read-only memory (ROM) 720 or the computer program instructions loaded into the random-access memory (RAM) 730 from the storage unit 780. The RAM 730 can also store various programs and data required for the operation of the device 700. The CPU 710, the ROM 720 and the RAM 730 are connected to each other via a bus 740. An input/output (I/O) interface 750 is also connected to the bus 740.

A plurality of components in the device 700 are connected to the I/O interface 750, including: an input unit 760, such as a keyboard, a mouse and the like; an output unit 770, such as various kinds of displays and loudspeakers and the like; the storage unit 780, such as a magnetic disk and an optical disk and the like; and a communication unit 790, such as a network card, a modem, a wireless transceiver and the like. The communication unit 790 allows the device 700 to exchange information/data with other devices via the computer network, such as the Internet, and/or various telecommunication networks.

The above described procedures and processing, such as the method 600, can also be performed by the processing unit 710. For example, in some embodiments, the method 600 can be implemented as a computer software program tangibly included in the machine-readable medium, for example, the storage unit 780. In some embodiments, the computer program can be partially or fully loaded and/or mounted to the device 700 via the ROM 720 and/or the communication unit 790. When the computer program is loaded onto RAM 730 and executed by the CPU 710, one or more actions of the above described method 600 can be implemented.

The present disclosure can be a method, apparatus, system and/or computer program product. The computer program product can include a computer-readable storage medium, on which the computer-readable program instructions for performing various aspects of the present disclosure are loaded.

The computer-readable storage medium can be a tangible apparatus that maintains and stores instructions utilized by the instruction executing apparatus. The computer-readable storage medium can be, but not limited to, such as an electrical storage device, a magnetic storage device, an optical storage device, an electromagnetic storage device, a semiconductor storage device or any appropriate combinations of the above. More detailed examples (non-exhaustive list) of the computer-readable storage medium include: a portable computer disk, a hard disk, a random-access memory (RAM), a read-only memory (ROM), an erasable programmable read-only memory (EPROM or flash memory), a static random-access memory (SRAM), a portable compact disk read-only memory (CD-ROM), a digital versatile disk (DVD), a memory stick, a floppy disk, a mechanical coding device, a punched card having stored instructions thereon, or raised structures in a groove, and any appropriate combinations of the above. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical fibers transmission, wireless transmission, routers, firewalls, switches, gateway computers and/or edge servers. A network adapter card or network interface in each computing/processing device receives computer readable program instructions from the network, and forwards the computer readable program instructions for storage in a computer readable storage medium within the respective computing/processing device.

Computer program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the case relating to the remote computer, the remote computer may be connected to the user's computer through any type of network, including a local area network (LAN) or a wide area network (WAN), or may be connected to an external computer (for example, through the Internet using an Internet Service Provider). In some embodiments, electronic circuitry, for example, programmable logic circuitry, field-programmable gate arrays (FPGA), or programmable logic arrays (PLA), which may execute computer readable program instructions, may be customized by utilizing the state information of the computer readable program instructions, in order to perform aspects of the present disclosure.

Aspects of the present disclosure are described herein with reference to flowchart illustrations and/or block diagrams of methods, apparatus (systems), and computer program products according to embodiments of the disclosure. It would be understood that each block of the flowchart illustrations and/or block diagrams, and combinations of blocks in the flowchart illustrations and/or block diagrams, can be implemented by computer readable program instructions.

These computer readable program instructions may be provided to a processing unit of a general purpose computer, special purpose computer, or other programmable data processing apparatus to produce a machine, such that the instructions, being executed by the processing unit of the computer or other programmable data processing apparatus, create an apparatus for implementing the functions/acts specified in the flowchart and/or block diagram block or blocks. These computer readable program instructions may also be stored in a computer readable storage medium, and direct a computer, a programmable data processing apparatus, and/or other devices to function in a particular manner, such that the computer readable storage medium having instructions stored therein comprises an article of manufacture including instructions which implement aspects of the functions/acts specified in the flowchart and/or block diagram block or blocks.

The computer readable program instructions may also be loaded onto a computer, other programmable data processing apparatus, or other device to cause a series of operational steps to be performed on the computer, other programmable data processing apparatus or other device to produce a computer implemented process, such that the instructions, being executed on the computer, other programmable apparatus, or other device, implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, code segment, or portion of code, which comprises one or more executable instructions for implementing the specified logical function(s). In some alternative implementations, the functions noted in the block may occur in an order different from that noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for the purpose of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or the technical improvement over technologies found in the marketplace, or to enable others of ordinary skilled in the art to understand the embodiments disclosed herein.

We claim:

1. A method of managing sessions, comprising:
   obtaining first identification information of a first session of a plurality of sessions and group operation identification information of a group operation to be performed for the plurality of sessions, each of the plurality of sessions replicating, from a source of the session to a destination of the session, a file system or a management system that manages the file system;
   determining whether the first session meets a condition that a session is suitable to be selected as a managing session, the managing session managing the plurality of sessions to perform the group operation on the plurality of sessions, wherein determining whether the first session meets the condition includes:
   obtaining a state of the first session based on the first session identification information;
   determining whether the state indicates that the first session is in failover;
   determining whether the destination of the first session is a site at which the group operation was initiated;
   in response to determining that the state indicates that the first session is not in failover and determining that the destination of the first session is a site at which the group operation was initiated, determining that the first session meets the condition; and
   otherwise, determining that the first session does not meet the condition;
   in response to the first session failing to meet the condition, obtaining second identification information of a second session of the plurality of sessions, the second identification information being different from the first identification information; and
   selecting the managing session based on the second identification information.

2. The method of claim 1, further comprising:
   in response to the first session meeting the condition, selecting the first session as the managing session.

3. The method of claim 1, wherein selecting the managing session based on the second identification information comprises:
   determining whether the second session meets the condition that a session is suitable to be selected as a managing session; and
   in response to the second session meeting the condition, selecting the second session as the managing session.

4. The method of claim 1, wherein the group operation is for switching sources and destinations of the plurality of sessions.

5. The method of claim 1, further comprising:
   determining the condition based on the group operation identification information.

6. The method of claim 3, wherein determining whether the second session meets the condition comprises:
   obtaining a state of the second session based on the second session identification information; and
   determining whether the state of the second session matches the condition.

7. A device for managing replication sessions, comprising:
   at least one processing unit;
   at least one memory coupled to the at least one processing unit and having stored thereon instructions executed by the at least one processing unit, the instructions, when executed by the at least one processing unit, causing the device to perform actions comprising:
      obtaining first identification information of a first replication session of a plurality of replication sessions and group operation identification information of a group operation to be performed for the plurality of replication sessions, each of the plurality of replication sessions replicating, from a source of the replication session to a destination of the replication session, a file system or a management system that manages the file system;
      determining whether the first replication session meets a condition that a replication session is suitable to be selected as a managing session, the managing session managing the plurality of replication sessions to perform the group operation on the plurality of replication sessions, wherein determining whether the first replication session meets the condition includes:
         obtaining a state of the first replication session based on the first session identification information;
         determining whether the state indicates that the first replication session is in failover;
         determining whether the destination of the first replication session is a site at which the group operation was initiated;
         in response to determining that the state indicates that the first replication session is not in failover and determining that the destination of the first session is a site at which the group operation was initiated, determining that the first replication session meets the condition; and
         otherwise, determining that the first replication session does not meet the condition;
      in response to the first replication session meeting the condition, selecting the first replication session as the managing session; and
      in response to the first replication session failing to meet the condition, obtaining second identification information of a second replication session of the plurality of sessions, the second identification information being different from the first identification information, and selecting the managing session based on the second identification information.

8. The device of claim 7, wherein selecting the managing session based on the second identification information comprises:
   determining whether the second replication session meets the condition that a replication session is suitable to be selected as a managing session; and
   in response to the second replication session meeting the condition, selecting the second replication session as the managing session.

9. The device of claim 7, wherein the group operation switches sources and destinations of the plurality of replication sessions.

10. The device of claim 7, wherein the actions further comprise:
    determining the condition based on the group operation identification information.

11. The device of claim 8, wherein determining whether the second replication session meets the condition comprises:
    obtaining a state of the second replication session based on the second replication session identification information; and
    determining whether the state of the second replication session matches the condition.

12. A computer program product for managing replication sessions, the computer program product comprising:
    a non-transitory computer readable medium encoded with computer-executable code, the code configured for the execution of:
       obtaining first identification information of a first replication session of a plurality of replication sessions and group operation identification information of a group operation to be performed for the plurality of replication sessions, each of the plurality of replication sessions replicating, from a source of the replication session to a destination of the replication session, a file system or a management system that manages the file system;
       determining whether the first replication session meets a condition that a replication session is suitable to be selected as a managing session, the managing session managing the plurality of replication sessions to perform the group operation on the plurality of replication sessions, wherein determining whether the first replication session meets the condition includes:
          obtaining a state of the first replication session based on the first session identification information;
          determining whether the state indicates that the first replication session is in failover;
          determining whether the destination of the first replication session is a site at which the group operation was initiated;
          in response to determining that the state indicates that the first replication session is not in failover and determining that the destination of the first session is a site at which the group operation was initiated, determining that the first replication session meets the condition; and
          otherwise, determining that the first replication session does not meet the condition;
       in response to the first session meeting the condition, selecting the first session as the managing session; and
       in response to the first replication session failing to meet the condition, obtaining second identification information of a second replication session of the plurality of replication sessions, the second identification information being different from the first identification information, and selecting the managing session based on the second identification information.

13. The computer program product of claim 12, wherein selecting the managing session based on the second identification information comprises:

determining whether the second replication session meets the condition that a replication session is suitable to be selected as a managing session; and in response to the second replication session meeting the condition, selecting the second replication session as the managing session.

14. The computer program product of claim 12, wherein the group operation is for switching sources and destinations of the plurality of replication sessions.

15. The computer program product of claim 12, the code further configured for the execution of:

determining the condition based on the group operation identification information.

16. The method of claim 1 wherein replicating the file system from the source of the session to the destination of the session includes mirroring the file system from one site to a different site.

* * * * *